United States Patent
Jensen

[15] 3,661,223
[45] May 9, 1972

[54] TRACTOR FRAME STRUCTURE

[72] Inventor: John C. Jensen, 559 Monroe Blvd., South Haven, Mich. 49090

[22] Filed: Dec. 5, 1969

[21] Appl. No.: 882,550

[52] U.S. Cl. ............................................. 180/54 D, 280/490
[51] Int. Cl. ......................................... B60k 9/00, B60d 1/00
[58] Field of Search .................. 180/1 F, 54 D; 280/490, 106

[56] References Cited

UNITED STATES PATENTS

| | | | |
|---|---|---|---|
| 2,246,627 | 6/1941 | Heaslet | 180/54 D |
| 2,443,804 | 6/1948 | Sauer | 180/54 D X |
| 1,903,968 | 4/1933 | Hosmer | 180/1 F |

FOREIGN PATENTS OR APPLICATIONS

| | | | |
|---|---|---|---|
| 513,029 | 8/1952 | Belgium | 280/490 |
| 840,799 | 6/1952 | Germany | 280/490 |
| 1,087,377 | 2/1955 | France | 180/1.5 |

*Primary Examiner*—Leo Friaglia
*Attorney*—Woodhams, Blanchard and Flynn

[57] ABSTRACT

A tractor and, in particular, a tractor having an improved frame structure for permitting same to be easily assembled and maintained by nonskilled personnel. The frame structure comprises a rectangular frame having an upwardly extending seat support member, the lower ends of the seat support member having a draw bar device pivotally mounted thereon. The tractor is provided with a rear axle housing which has a pair of substantially parallel bracket plates fixedly secured thereto, which bracket plates are releasably connected to the rearward end of the rectangular frame.

8 Claims, 7 Drawing Figures

PATENTED MAY 9 1972

INVENTOR.
JOHN C. JENSEN
BY
Woodhams, Blanchard & Flynn
ATTORNEYS

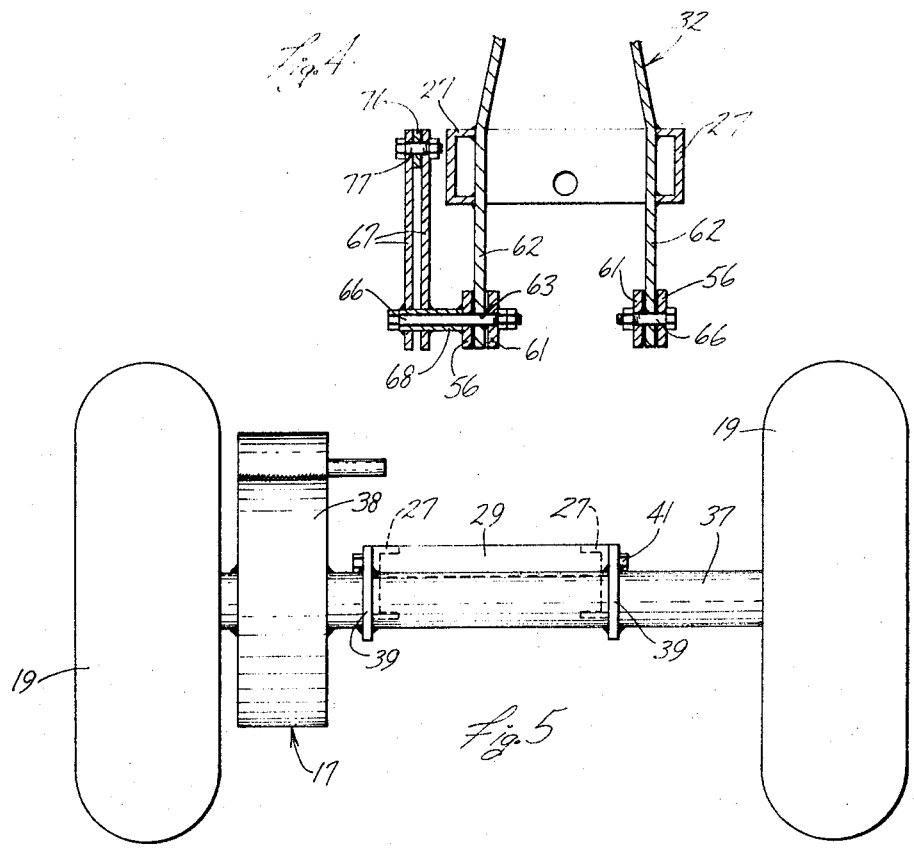
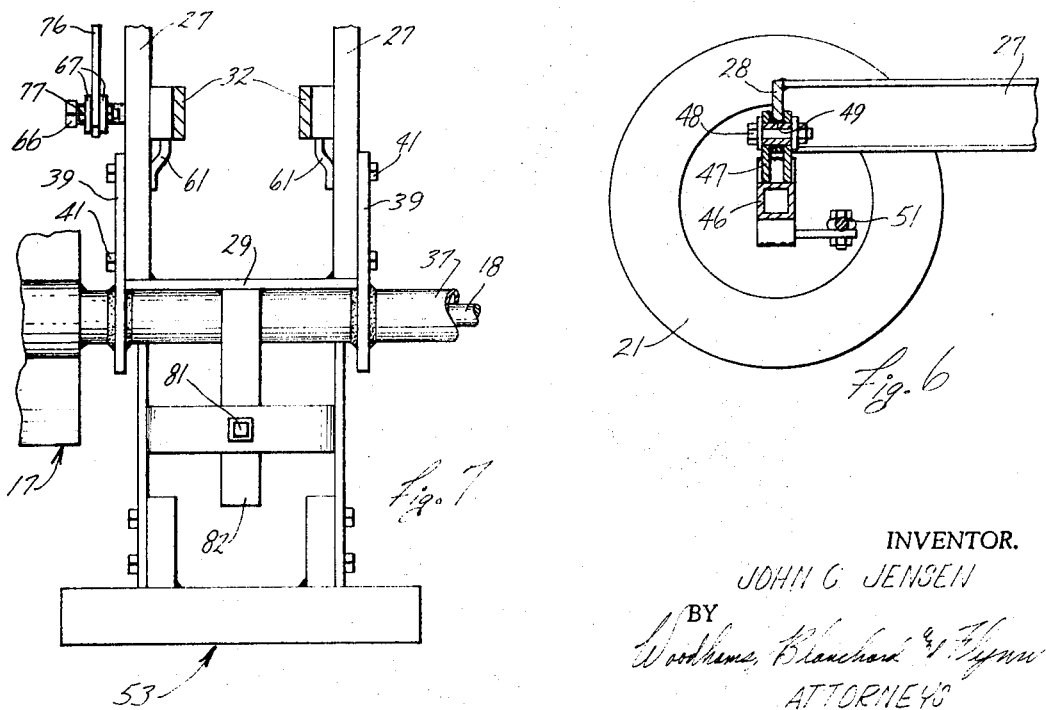

TRACTOR FRAME STRUCTURE

FIELD OF THE INVENTION

This invention relates to a tractor and, in particular to a tractor having an improved frame structure to facilitate assembly, maintenance and replacement of parts by nonskilled personnel.

BACKGROUND OF THE INVENTION

Farming in this country is an advanced technology and most farms are of large size in order to efficiently and economically utilize the more advanced scientific principles and farm machinery presently available. The farm machinery, and particularly tractors, utilized on modern farms in this country are expensive and complex since such tractors must be able to satisfactorily perform when used in accordance with the most modern scientific farming principles now in common usage. Further, the tractors must be able to perform substantially large quantities of work due to the large size of present day farms.

While most tractors produced in this country are highly desirable when used on large farms wherein modern scientific farming principles are utilized, and where sufficient skilled personnel is available to perform the necessary repair and maintenance thereon, it has been found that such large and complex tractors are not suitable for use on relatively small farms since such tractors are not only unnecessarily expensive, but they are also mechanically and structurally too complex so that maintenance and repair is made unduly difficult, if not impossible.

In particular, there presently exists a need in foreign countries, such as in Central and South America and in Africa, for a tractor which is relatively inexpensive and which is mechanically and structurally simple to repair and operate. These foreign countries still have large numbers of small farms which are completely run by one or two persons. Further, the small farms in these foreign countries do not utilize the modern scientific and mass farming techniques presently being utilized in this country and thus the highly automated and complex machinery suitable for farming in this country is not suitable for farming in these foreign countries.

Further, the tenant or owner of the small farms in these less advanced farming countries do not possess the technical skill, tools or equipment necessary to permit assembling, maintenance or repair of the complex tractors or farm machinery utilized in this country. Further, necessary repair parts are often not easily obtainable in these foreign countries and thus the complex tractors presently utilized in this country have proven undesirable for use in these foreign countries since the inability to obtain replacement parts for purposes of repair generally results in the tractor being shut down for extended periods of time, thereby completely destroying the usefulness of the tractor and imposing a severe handicap on the farmer.

Accordingly, it is an object of this invention to provide a simplified tractor suitable for use on small farms, and particularly designed for export purposes, which will overcome the numerous objections and disadvantages as set forth above.

Specifically, it is an object of this invention:

1. To provide a farm-type tractor having a simplified frame structure which facilitates assembly, maintenance and repair of the tractor.

2. To provide a tractor, as aforesaid, wherein the rear axle of the tractor is detachably connected to the frame in a simple manner to facilitate assembly, maintenance, repair and replacement of parts.

3. To provide a tractor, as aforesaid, which can be easily assembled, maintained and repaired by technically nonskilled persons.

4. To provide a tractor, as aforesaid, which can be easily shipped in a disassembled form for export purposes, with the tractor being easily assembled by nonskilled personnel without requiring any elaborate tools or machinery.

5. To provide a tractor, as aforesaid, which is relatively inexpensive to manufacture and maintain, and is dependable and simple in operation.

6. To provide a tractor, as aforesaid, wherein many of the elements of the frame and supporting members for the axles are constructed from simple structural members, thereby facilitating not only assembly and repair, but also permitting easy replacement of parts.

Other objects and purposes of this invention will be apparent to persons acquainted with devices of this type upon reading the following specification and inspecting the accompanying drawings.

BRIEF DESCRIPTION OF THE DRAWINGS

FIG. 4 is a fragmentary cross-sectional view taken along the line IV—IV of FIG. 3.

FIG. 5 is a rear elevational view of the rear axle housing as taken along the line V—V of FIG. 3.

FIG. 6 is a fragmentary sectional view illustrating the front end of the frame and the mounting structure for the front axle.

FIG. 7 is a partial top view as taken along the line VII—VII of FIG. 3.

Figure 1:
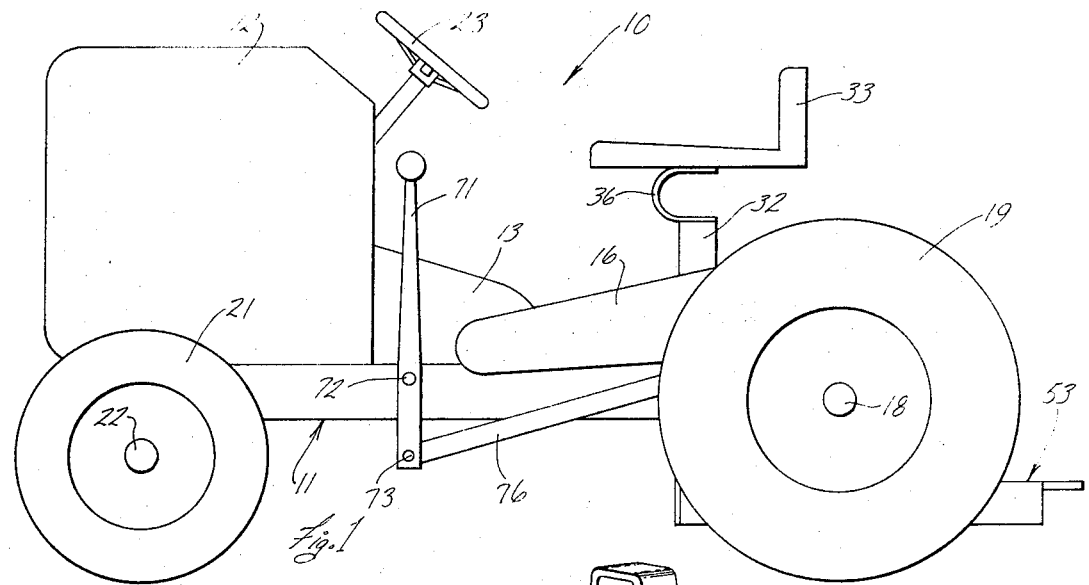
FIG. 1 diagrammatically illustrates therein a side elevational view of a tractor embodying therein the present invention.
Figure 2:
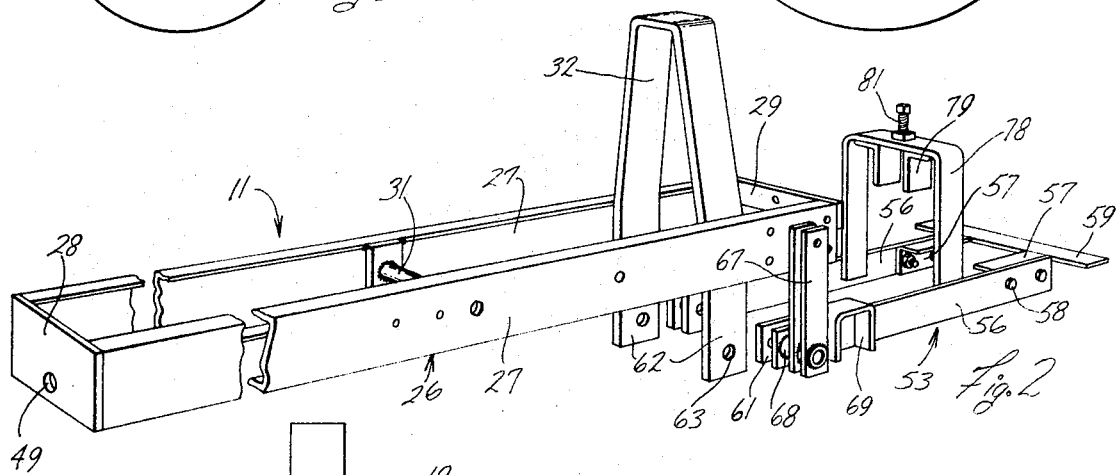
FIG. 2 is a perspective view of the improved frame structure according to the present invention.

Certain terminology will be used in the following description for convenience in reference only and will not be limiting. The words "upwardly," "downwardly," "rightwardly" and "leftwardly" will designate directions in the drawings to which reference is made. The words "front" and "rear" will refer in a conventional manner to the forward and rearward ends of the vehicle and designated parts thereof, which ends are the leftward and rightward ends, respectively, in FIG. 1. The words "inwardly" and "outwardly" will refer to directions toward and away from respectively, the geometric center of the device and designated parts thereof. Said terminology will include the words above specifically mentioned, derivatives thereof and words of similar import.

SUMMARY OF THE INVENTION

The objects and purposes of the present invention are met by providing a tractor having a rectangular, box-like frame which includes a pair of spaced, parallel channel members interconnectd adjacent opposite ends by front and rear end plates. The frame includes an upwardly extending U-shaped post member fixedly secured to and positioned adjacent the rearward end of the frame, which post member is adapted to have a vehicle seat mounted thereon. The lower free ends of the post extend below the frame and are provided with pivot connections for permitting a draw bar mechanism to be releasably pivotally mounted thereon, as by means of bolts. The draw bar mechanism includes upwardly extending control arms fixedly secured thereto, which control arms are connected by means of an interconnecting linkage to a manual control lever which is accessible to the tractor operator. The tractor includes a rear axle housing which has a pair of support plates fixedly secured thereto, which support plates are positionable adjacent the rearward sides of the frame and are releasably connected to the frame by any suitable means, as by a plurality of bolts. The forward end of the frame has a pivot support for releasably mounting the front axle.

DETAILED DESCRIPTION

FIG. 1 diagrammatically illustrates therein a tractor 10 which includes a frame structure 11 having an engine 12 mounted thereon. Engine 12 is connected to a transmission 13 which transmits drive torque through an intermediate drive transmitting mechanism 16 to the rear axle differential 17

(FIG. 5), which rear axle differential in turn drives the rear axle 18 to which is secured the rear wheels 19. The tractor 10 is also provided with conventional steerable front wheels 21 which are supported by a front axle 22, the front wheels being operatively interconnected by a conventional steering linkage (not shown) to the steering wheel 23.

The frame structure 11 includes a rectangular, box-like frame member 26 which has a pair of parallel, elongated side members 27, which side members preferably comprise opposed inwardly directed channels. The opposite ends of the side members 27 are fixedly interconnected by front and rear end plates 28 and 29, respectively. The side members 27 and end plates 28 and 29 are preferably suitably welded together to produce a structurally strong but light weight frame. The frame 26 additionally includes a reinforcing rod 31 fixedly secured to and extending between the side members 27.

Frame structure 11 further includes a downwardly opening, U-shaped support member 32 fixedly secured to the frame member 26, adjacent the rearward end thereof. The support member 32 is adapted to have a driver's seat 33 mounted thereon by means of a conventional spring support plate 36. The rearward end of the rectangular frame member 26 is also connected to the tubular rear axle housing 37, which housing surrounds and rotatably supports the rear axle 18 and is fixedly connected to the differential housing 38 (FIG. 5). The rear axle housing 37 has a pair of plate-like mounting brackets 39 fixedly secured thereto, as by welding, which bracket plates 39 extend forwardly so as to be positioned adjacent the external side surfaces of the side members 27 adjacent the rearward ends thereof. The rearward ends of the side members 27 and the bracket plates 39 are each provided with a plurality of alignable openings through which extend a plurality of connecting means, such as bolts 41, for permitting the brackets 39 and the rear axle housing 37 secured thereto to be releasably connected to the frame member 26.

The forward end of the frame member 26 is utilized to support the front axle 22 and, as illustrated in FIG. 6, the forward end of the frame member 26 supports a swivel post 46 to which is fixedly secured the front axle 22. Swivel post 46 is pivotally mounted on a downwardly extending member 47, which member is fixedly secured to the front end plate 28 by means of a bolt 48 which extends through an opening 49 provided therein. A conventional tie rod linkage 51 extends between the front wheels 21 and is interconnected to the steering wheel 23 by means of a conventional steering linkage (not shown) for controlling the steering movement of the front wheels.

The tractor 10 is further provided adjacent its rearward end with a movable draw bar device 53, which device includes a pair of substantially parallel side bars 56, each of which has an angle bracket 57 fixedly secured to the rear end thereof as by bolts 58. The angle brackets 57 are fixedly secured, as by welding, to a transverse mounting bar 59.

The forward end of each side bar 56 is further provided with a laterally offset ear 61 fixedly secured thereto, so as to result in the formation of a fork-like structure on the forward end of each side bar 56. The fork-like foward ends of the side bars 56 are adapted to be positioned in surrounding relationship to the free extending end portions 62 of the U-shaped support member 32. The free end portions 62 are each provided with an opening 62 therein which is adapted to align with similar openings formed in the forked forward ends of the side bars 56 so as to permit a bolt 66 to pass therethrough to pivotally mount the draw bar device 53 relative to the frame structure 11.

Draw bar device 53 is further provided with an upwardly extending bifurcated arm 67 secured to the forward end of the outermost side bar 56. The bifurcated arm 67 is spaced outwardly from and fixedly interconnected to the side bar 56 by means of an intermediate sleeve 68, which sleeve is preferably suitably welded to both the side bar 56 and the arm 67. A U-shaped reinforcing member 69 is preferably fixedly secured, as by welding, to both the side bar 56 and the arm 67 to provide a strong and secure interconnection between the arm 67 and the side bar 56.

To permit the draw bar device 53 to be pivotally moved relative to the frame structure 11, the tractor 10 is provided with a manual control lever 71 pivotally interconnected to the frame structure 11 by means of a pivot pin 72, which control lever 71 is readily accessible by the tractor driver. The control lever 71 is further provided with an additional pivot pin 73 adjacent the lower free end thereof, which pivot pin interconnects the control lever 71 to an intermediate link 76. Intermediate link 76 is in turn pivotally interconnected, by means of a pivot pin 77, adjacent its rearward end to the upper end of the arm 67.

Figure 3:
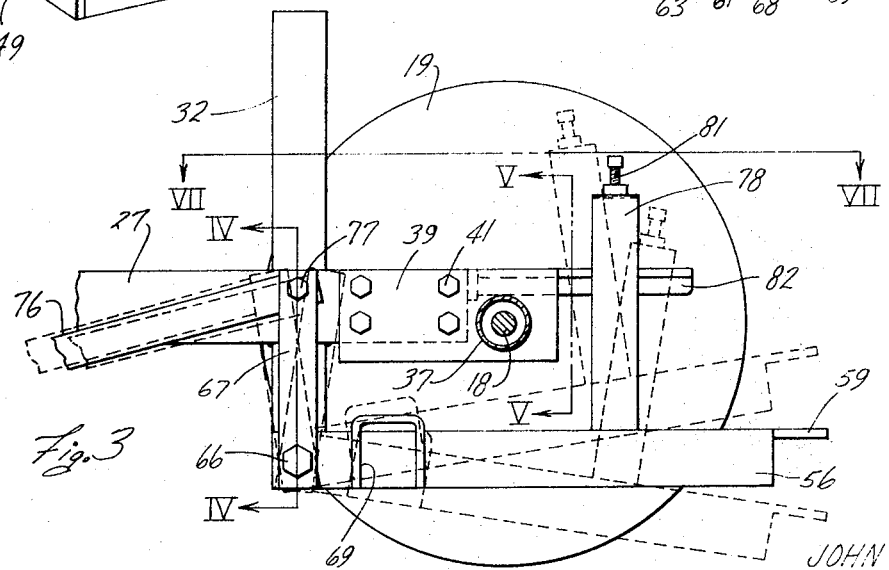
FIG. 3 is an enlarged fragmentary view of the rear end of the tractor frame illustrating the draw bar device and the manner in which the rear axle housing is connected to the frame.

The draw bar device 53 is further provided with a U-shaped limit member 78 fixedly secured thereto, the free ends of the legs of the U-shaped member 78 being suitably secured to the spaced side bars 56, as by welding. The U-shaped limit member 78 has a pair of L-shaped guide members 79 secured thereto, which guide members are spaced so as to define a central guide channel therebetween. An adjustable stop screw 81 is threadably engaged with the central portion of the limit member 78 and extends downwardly into the channel defined between the guide member 79. A suitable elongated stop member 82 (FIG. 3) is fixedly secured to and extends rearwardly from the frame member 26, the stop member 82 extending into the guide channel defined between the guide members 79 whereby the stop member 82 is adapted to contact the stop screw 81 for controlling or limiting the downward pivotal movement of the draw bar device 53.

ASSEMBLY AND OPERATION

The tractor 10, as discussed above, is highly desirable for export to countries wherein skilled technicians are not available for assembling or servicing same since the tractor, when manufactured, can be shipped in a disassembled condition. This thus facilitates shipping and reduces the shipping cost, with the tractor then being easily assembled by means of conventional hand tools upon reaching its destination. Specifically, after the frame structure 11 has been welded together, it can be shipped as a separate unit. Similarly, the rear axle housing 37 having the differential housing 38 secured thereto can also be shipped as one unit, and the draw bar mechanism 53 can likewise be shipped as a unit.

Upon reaching its destination, the tractor can be readily assembled by connecting the rear axle housing 37 to the frame member 26 by positioning the bracket plates 39 adjacent the outer side surfaces of the rear ends of the side members 27 and fixedly interconnecting same by means of bolts 41. The front axle support can then be secured by mounting the swivel post 46 to the frame 26 by means of the bolt 48, which bolt extends through the opening 49 provided in the front end plate 28. The axles and front and rear wheels can then be suitably mounted, the axle structure and the mountings therefor being conventional and thus not being described in detail.

When it is desired to mount the draw bar devise 53, same can be positioned so as to straddle the rearward end of the frame member 26 so that the forked forward ends of the side bars 56 straddle the lower free ends 62 of the U-shaped support member 32. The bolts 66 are then extended through the openings so that the draw bar mechanism is pivotally supported relative to the frame structure 11.

As indicated above, the above assembly can be easily performed without requiring any special equipment or tools, and additionally can be performed by a person having minimum technical knowledge or skill. The tractor can likewise be easily disassembled when it is desired to perform either maintenance or repair thereon. Further, when a part failure occurs, many of the parts can be easily replaced by manufacturing a new part from a conventional structural manner, thereby not necessitating the ordering of a standard factory made part.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which I claim an exclusive property or privilege are defined as follows:

1. In a tractor, comprising:
   frame means including a pair of spaced, substantially parallel elongated side members and a plurality of transverse members extending between and fixedly interconnecting said pair of elongated side members;
   a rear axle means fixedly and releasably secured to said frame means, said rear axle means including a rear axle housing and a rear axle rotatably supported within sad housing;
   means for releasably and fixedly interconnecting said rear axle housing to said frame means, said means including a pair of bracket members fixedly secured to said rear axle housing, said bracket members being positionable directly adjacent the rearward ends of said elongated side members, and releasable fastening means for fixedly securing said bracket members to said side members; and
   post means fixedly secured to said frame means and extending upwardly therefrom, said post means comprising a downwardly opening U-shaped member adapted to have a vehicle seat mounted on the upper end thereof, the legs of said U-shaped member being fixedly interconnected to said side members with the free ends of said legs extending downwardly below said side members for permitting attachment of a draw bar device.

2. A device according to claim 1, wherein said frame means comprises a rectangular box-like frame member, and said transverse members include an end plate interconnecting said side members adjacent opposite ends thereof; and
   wherein said bracket members comprise a pair of plate-like members integrally connected to said rear axle housing and extending outwardly therefrom, each of said plate-like members having a plurality of openings therein and each of said side members also having a plurality of openings therein adjacent the rearward ends thereof, the openings in said side members being adapted to be alignable with the openings in said plate-like members when said plate-like members are positioned adjacent said side members, and said releasable fastening means comprising a plurality of threaded fastening members.

3. A device according to claim 2, further includes a draw bar device pivotally interconnected to the lower free ends of said U-shaped member.

4. A device according to claim 3, further including manually controlled linkage means interconnected to said draw bar device for controlling the angular position thereof.

5. A device according to claim 2, wherein said side members are each of channel-shaped configuration.

6. A device according to claim 1, further including a draw bar device pivotally interconnected to the lower free ends of said U-shaped member.

7. In a tractor, comprising:
   frame means including a pair of spaced, substantially parallel elongated side members and a plurality of transverse members extending between and fixedly interconnecting said pair of elongated side members;
   a rear axle means fixedly and releasably secured to said frame means, said rear axle means including a rear axle housing and a rear axle rotatably supported within said housing;
   means for releasably and fixedly interconnecting said rear axle housing to said frame means, said means including a pair of bracket members fixedly secured to said rear axle housing, said bracket members being positionable directly adjacent the rearward ends of said elongated side members, and releasable fastening means for fixedly securing said bracket members to said side members;
   post means fixedly secured to said frame means and extending upwardly therefrom, the upper end of said post means being adapted to have a vehicle seat mounted thereon, the lower end of said post means extending below said frame means and having means thereon for permitting attachment of a draw bar device; and
   a draw bar device and means pivotably mounting same on said frame means, said draw bar device including a pair of substantially parallel, rearwardly extending side bars and a mounting bar fixedly connected to and extending transversely between the rearward ends of said side bars, said side bars being pivotally connected adjacent the forward ends thereof to said frame means, and stop means mounted on said frame means for limiting downward pivotal movement of said draw bar device.

8. In a tractor, comprising:
   frame means comprising a rectangular box-like frame member, said frame means including a pair of spaced, substantially elongated side members and a plurality of transverse members extending between and fixedly interconnecting said pair of elongated side members;
   a rear axle means fixedly and releasably secured to said frame means, said rear axle means including a rear axle housing and a rear axle rotatably supported within said housing;
   means for releasably and fixedly interconnecting said rear axle housing to said frame means, said means including a pair of bracket members fixedly secured to said rear axle housing, said bracket members being positioned directly adjacent the rearward ends of said elongated side members, and releasable threaded fastening means for fixedly securing said bracket members to said side members;
   post means fixedly secured to said frame means and extending upwardly therefrom, the lower end of said post means extending below said frame means;
   a vehicle seat and means fixedly securing said vehicle seat to the upper end of said post means; and
   a draw bar device pivotally interconnected to the lower end of said post means, said draw bar device including an elongated member extending rearwardly of said frame means to a point located beyond said rear axle means, and stop means coacting between said frame means and said draw bar device for limiting downward pivotal movement of said draw bar device.

* * * * *